United States Patent [19]

Cannon

[11] Patent Number: 4,771,567
[45] Date of Patent: Sep. 20, 1988

[54] FISHING LURE

[76] Inventor: Rodney M. Cannon, 702 Opal St., Boise, Id. 83705

[21] Appl. No.: 128,626

[22] Filed: Dec. 4, 1987

[51] Int. Cl.$^4$ .................................................. A01K 85/00
[52] U.S. Cl. ................................. 43/42.26; 43/42.28; 43/42.39
[58] Field of Search ................ 43/42.26, 42.3, 42.28, 43/42.29, 44.2, 44.8, 42.52, 42.38, 42.39

[56] References Cited

U.S. PATENT DOCUMENTS

| | | | |
|---|---|---|---|
| 1,265,900 | 5/1918 | Foss | 43/42.29 |
| 1,546,105 | 7/1925 | Powell | 43/42.52 |
| 2,106,370 | 1/1938 | Bryan | 43/42.29 |
| 2,164,415 | 7/1939 | Mallett | 43/42.52 |
| 2,590,723 | 3/1952 | Roes | 43/42.52 |
| 2,646,642 | 7/1953 | Dunham | 43/42.52 |
| 2,817,922 | 12/1957 | Takeshita | 43/42.39 |
| 2,908,104 | 10/1959 | Hutchins | 43/42.29 |
| 4,516,352 | 5/1985 | Firmin | 43/42.39 |

Primary Examiner—Gene P. Crosby
Attorney, Agent, or Firm—Paul F. Horton

[57] ABSTRACT

A fishing lure including a jig and a body. The body may be formed in the shape of any suitable bait, for example, a craw-dad, and includes a top wall and side walls to define a channel for receiving the jig. To maintain the body in a horizontal position during movement through the water, a shank having a central horizontal portion; a front upwardly inclined portion; and a rear downwardly inclined portion is provided. A novel keeper formed from lead ballast is provided for holding the body to the jig. The keeper works in conjunction with the jig eye, which protrudes through the front portion of the body for affixing the body to the jig. An upwardly curved hook, hidden beneath the body, engages the body to act as a third keeper. The front of the body may be provided with a spring-like flap for skipping the lure over stones and other foreign objects.

12 Claims, 1 Drawing Sheet

FISHING LURE

BACKGROUND OF THE INVENTION

1. Field of the Invention

This invention relates to lures in general and more particularly to lures having a jig to which selected body portions are readily attached and detached.

2. Description of the Prior Art

For ease of construction and to provide lures with a variety of simulated bait, it is highly desirable that lures be provided which have a body which has a natural appearance and feel and which is readily attachable and detachable from a jig. It is also desirable that such a lure move through the water in its normal position; that the body be securely fastened to the jig; that the lure not be highly susceptible to snags; and further, for reasons of accurate simulation as well as safety, that the hook not be exposed. Also, to be practical, the costs of construction must not be excessive.

W. J. Grube, in U.S. Pat. No. 1,247,955, discloses a lure which is made of resilient rubber and which includes a hook protector. The body portion of the Grube device is molded onto a keeper to prevent separation of the body from the jig. D. D. Scott, in U.S. Pat. No. 2,820,314, discloses a three piece shank, with attached hook, all of which are embedded in the body, for proper movement through the water, as well as hiding the hook, the providing the esthetic quality desired as well as avoiding snags. Other relevant patents are Falvey, U.S. Pat. Nos. 208,581; Townsend, 2,303,097; Wright, 1,813,722; Boehm, 1,976,695; Deering, 2,218,280; and Firmin, 4,516,352.

SUMMARY OF THE INVENTION

The present invention is a lure having separate jig and body portions which are held together by a novel keeper arrangement; which includes a novel jig shank for maintaining proper position in the water; which provides for a body which is readily removable, but yet hides a hook which also serves as a keeper; which provides a novel ballast-keeper combination; and which is constructed to prevent snagging. Additional objects and advantages will become apparent and a more thorough and comprehensive understanding may be had from the following description taken in conjunction with the accompanying drawings forming a part of this specification.

DETAILED DESCRIPTION OF THE INVENTION

Figure 1:
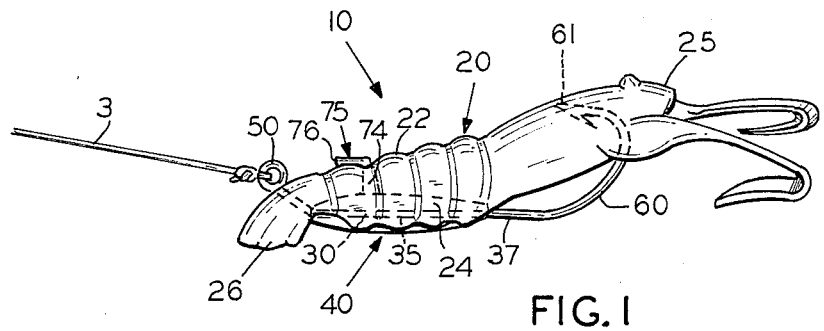
FIG. 1 is a side elevation of the lure of the present invention showing the covered jig in outline.

Referring now the the drawings and more particularly to FIG. 1, an embodiment to be preferred of a fishing lure 10, made according to the present invention, is disclosed. Lure 10 includes a body 20 and a jig 40.

Figure 2:
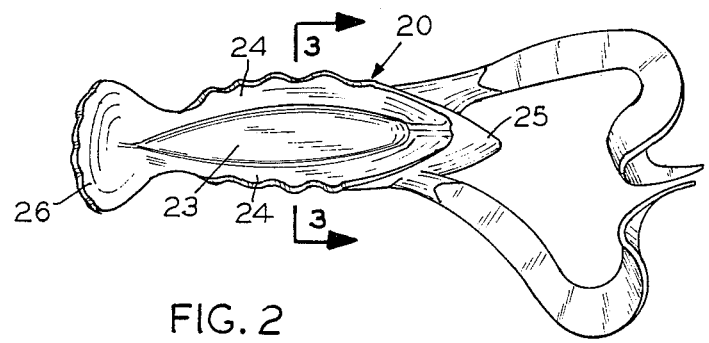
FIG. 2 is a perspective view of the underside of the body of the lure.
Figure 3:
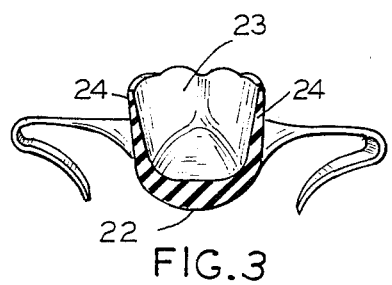
FIG. 3 is a sectional view of the body taken along lines 3—3 of FIG. 2.

Body 20 may represent any desired bait; a crawfish, otherwise known as a crawdad, being shown. The body may be constructed of any resilient material such as soft rubber, soft polyvinylchloride, or polyethylene. The body includes a top wall 22 and a pair of laterally spaced side walls 24 to define a longitudinal channel 23, shown to advantage in FIGS. 2 and 3. At the front end 25 of the crawfish body, which is the rear end of the lure, the top wall is thickened for receiving end point 61 of hook 60, as will hereinafter be explained. The rear end of the crawfish body, i.e., the front of the lure is provided with a resilient, spring-like flap 26. Flap 26 is forwardly and downwardly inclined so that the lure, when pulled through the water, as by line 3, will first impact a stone or other object by flap 26, causing the lure to spring over or skip over the object.

Figure 4:
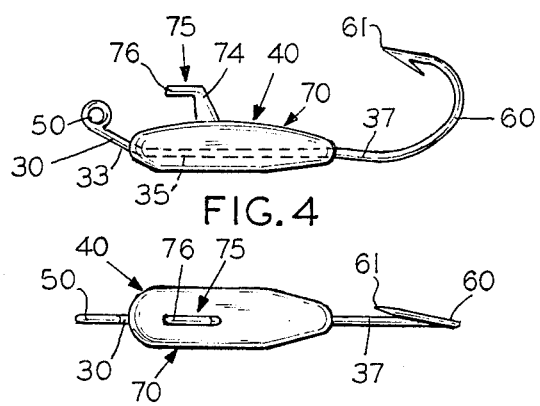
FIG. 4 is a side view of the jig showing the embedded portion of the shank in outline.
Figure 5:
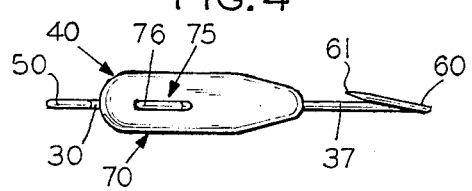
FIG. 5 is a plan view of the jig.

Jig 40, shown to advantage in FIGS. 4 and 5, when taken with FIG. 1, includes a shank, designated generally be the numeral 30; and eye 50, formed at the forward most end of the shank; a hook 60; and a ballast-keeper 70.

Shank 30, to maintain the lure in proper position when moving through the water, includes a central horizontal portion 35; a forward and upwardly inclined portion 33; and a rearward and downwardly inclined portion 37. A shank of such structure permits horizontal movement of a lure which has an upwardly curved hook by effectively lowering the hook and raising the eye relative to one another. Forward portion 33 may be integral with central portion 35 or may be otherwise rigidly secured thereto. By being upwardly inclined at an obtuse angel of 130°-150° and on a plane with the central portion, the forward portion may protrude through an opening, not shown, punched through body 40, terminating in eye 50 for attachment of fishing line 3. In this manner the shank, eye, and line do not interfere with the operation of flap 26. Rearward portion 37 may also be integral with central portion 35 or may be likewise rigidly affixed thereto. The rearward portion, in being downwardly inclined, also at an obtuse angle, preferably between 150°-170°, and likewise on a plane with the central portion, permits hook 60 to have a low profile and permits placement of the hook under the body without distorting the shape of the bait which, in the drawings shown, is in the shape of a crawfish. The fixed double angle of the shank also provides proper balance for substantially horizontal movement though the water.

Hook 60 is conventional in construction and is affixed to the remainder of the jig so as to curve upwardly, having pointed end 61 spaced vertically above and preferably planar with the shank. In this position, the lowermost portion of the hook provides a smooth curved undersurface to that portion of the jig to prevent snagging.

To provide proper weight to the lure, a novel ballast-keeper is provided. The ballast-keeper, designated generally by the numeral 70, is made of lead and is molded onto shank 30; the bulk of the ballast being on central shank portion 35. The ballast is provided with a smooth undersurface which, in cooperating with the smooth underside of the hook, rides over stones, rocks, and other objects to prevent snagging. The ballast is molded so as to define a substantially L-shaped keeper, designated by the numeral 75, having a vertical post 74 from which forwardly extends horizontal member 76.

In mounting body 20 to jig 40, apertures, not shown, may readily be punched through soft and resilient top wall 22 by eye 50 and by keeper 75 in the approximate positions shown in FIG. 1; the top wall defining the fan shaped flap 26. In this manner, the jig is received within channel 23 defined by sidewalls 24 and top wall 22 of the body. Hook 60 is caused to engage the body with end point 61 of the hook piercing and partially embedded into the thickened resilient material on the undersurface of the top wall, adjacent front end 25 of the body; i.e., the rear end of the lure. The hook, in this position, is hidden and is also covered to prevent snagging. The undersurface of horizontal member 76 of keeper 75 engages the top surface of top wall 22 of body 20 with vertical post 74 extending vertically upward through the top wall. It will be appreciated, then, that the body is attached to the jig by three keepers, in effect; the eye serving as a keeper; keeper 75; and by hook 60.

Having thus described in detail a preferred embodiment of the present invention, it is to be appreciated and will be apparent to those skilled in the art that many physical changes could be made in the apparatus without altering the inventive concepts and principles embodied therein. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A lure comprising a jig and a body, said jig including a shank; a lead ballast mounted on said shank, said lead ballast defining a first body keeper operable to engage said body for holding said body to said jig; an eye formed at one end of said shank; and a hook formed at an opposing end of said shank, said hook upwardly curved and having a pointed end vertical of said shank, said body being constructed of resilient material and including a top wall and a pair of opposing side walls to define a longitudinal channel for receiving said jig therein and the pointed end of said hook operable to engage the resilient material of said body to define a second keeper.

2. The lure as described in claim 1 wherein said first keeper is substantially L-shaped in construction and includes a vertical post for protrusion through the top wall of said body and a horizontal member forwardly extending from the top of said post toward the eye of said jig for engaging the top surface of said top wall of said body.

3. A lure comprising a jig and a body, said jig including a shank having a central horizontal portion, a forward and upwardly inclined portion, and a rearward and downwardly inclined portion; an eye formed at the terminal end of said forward portion of said shank; and a hook formed at the rear of said rearward portion of said shank, said hook upwardly curved and having a pointed end vertical of said shank; and said body being constructed of resilient material and including a top wall and a pair of opposing side walls to define a longitudinal channel for receiving said jig therein.

4. The lure as described in claim 3 wherein said eye extends through said body for affixing said body to said jig.

5. The lure as described in claim 4 further comprising a lead ballast mounted on said shank.

6. The lure as described in claim 5 wherein said lead ballast defines a body keeper operable to engage said body for holding said body to said jig.

7. The lure as described in claim 6 wherein said keeper is substantially L-shaped in construction and includes a vertical post for protrusion through the top wall of said body and a horizontal member forwardly extending from the top of said post toward the eye of said jig for engaging the top surface of said top wall of said body.

8. The lure as described in claim 4 wherein the pointed end of said hook is operable to engage the resilient material on the underside of said top wall of said body for affixing the jig to the body and for covering said hook.

9. A lure comprising a jig and a body, said jig including a shank having a central horizontal portion, a forward and upwardly inclined portion, and a rearward and downwardly inclined portion; an eye formed at the terminal end of said forward portion of said shank, said eye extending through a top wall of said body for affixing said body to said jig; a hook formed at the rear of said rearward portion of said shank, said hook upwardly curved and having a pointed end vertical of said shank; and a lead ballast mounted on said shank, said ballast defining a body keeper operable to engage said body for holding said body to said jig; and said body being constructed of resilient material and including a top wall and a pair of opposing side walls to define a longitudinal channel for receiving said jig therein.

10. The lure as described in claim 9 wherein said keeper is substantially L-shaped in construction and includes a vertical post for protrusion through the top wall of said body and a horizontal member forwardly extending toward the eye of said jig for engaging the top surface of said body.

11. The lure as described in claim 9 wherein the pointed end of said hook is operable to engage the resilient material on the underside of said top wall of said body for affixing the jig to the body and for covering said hook.

12. The lure as described in claim 9 wherein said body includes a spring-like flap forwardly and downwardly inclined from horizontal for skipping the lure over foreign objects.

* * * * *